Oct. 18, 1949.　　　T. B. FUNK　　　2,484,989
GRASS TRIMMER
Filed Nov. 14, 1946　　　2 Sheets-Sheet 1
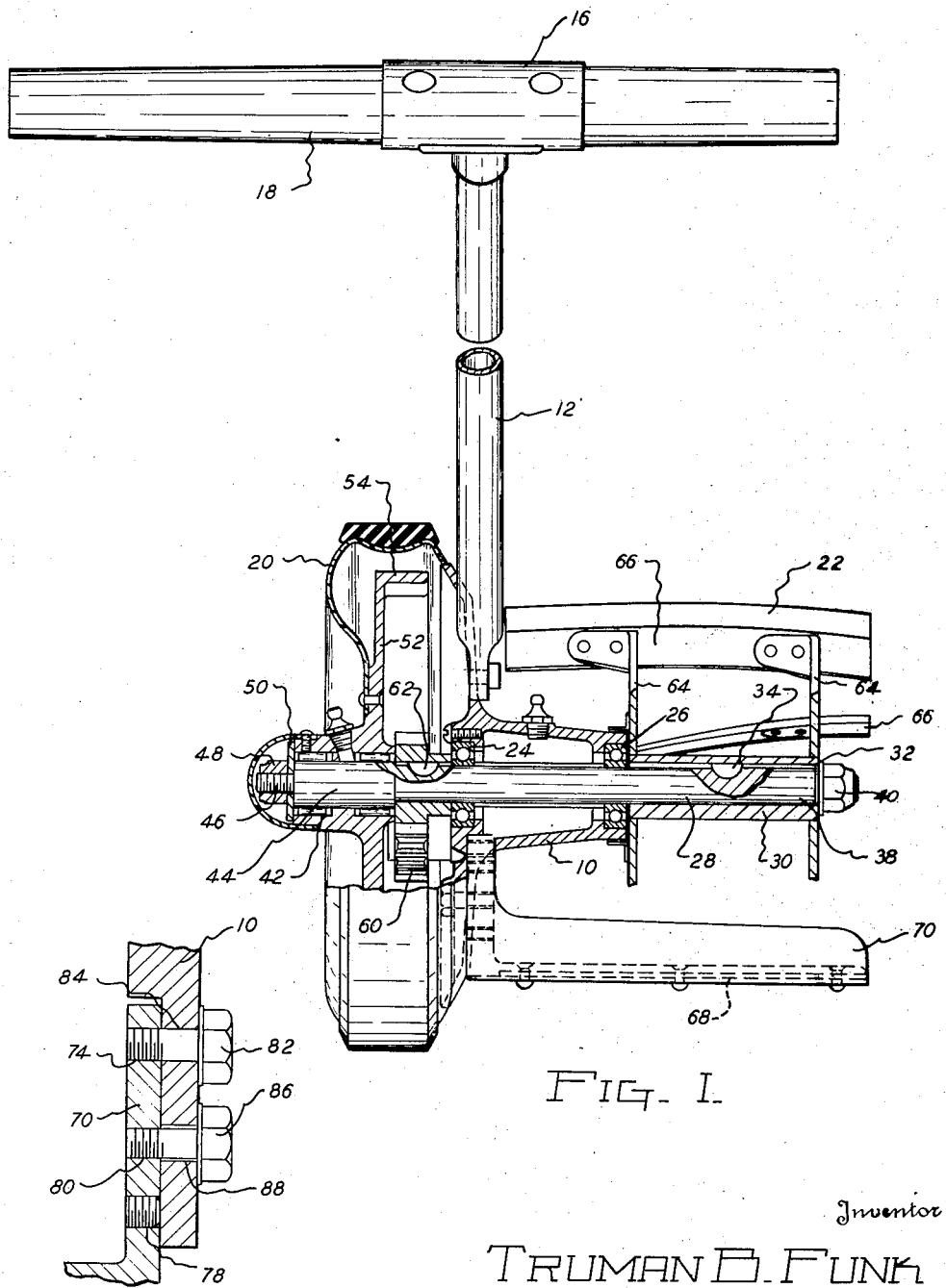
FIG. I.
FIG. IV.
Inventor
TRUMAN B. FUNK
By Beaman & Patch
Attorneys

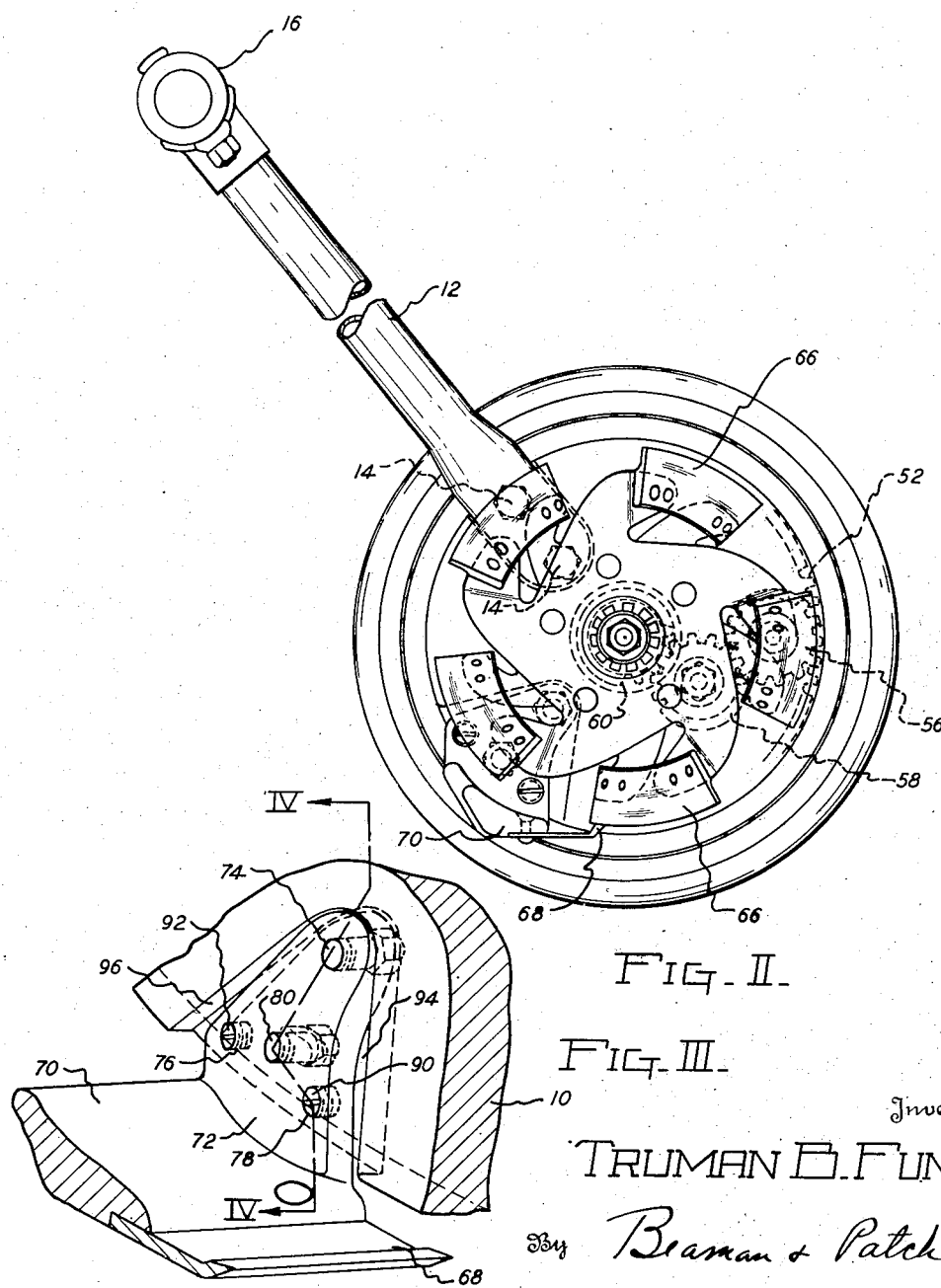

Patented Oct. 18, 1949

2,484,989

UNITED STATES PATENT OFFICE 2,484,989

GRASS TRIMMER

Truman B. Funk, Jackson, Mich.

Application November 14, 1946, Serial No. 709,804

3 Claims. (Cl. 56—249)

The present invention relates to improvements in grass trimmers characterized by the ability to cut the grass adjacent walls, sidewalks and shrubbery left uncut by the conventional lawn mower.

Single wheel grass trimmers have heretofore been proposed and have taken many shapes and forms. The present invention distinguishes principally over such prior designs through (a) an improved support for the reel shaft and cutter bar which eliminates all outboard support, (b) a concentric arrangement of the axis of the single drive wheel and reel shaft, (c) the elimination of a ground roller and the positioning of the shearing edge of the cutter bar in substantially a vertical plane through the axis of the reel and drive wheel, (d) an operating handle rigidly attached to the frame structure to cause the cutter bar to follow the pivotal action of the handle about the axis of the drive wheel and reel, and (e) the method of adjustment of the cutter bar relative to the reel.

Thus, one of the objects of the present invention is to provide an improved single wheel grass trimmer characterized by its balance, ease of operation, and freedom of structure rearwardly of the cutter bar or adjacent the outboard end of the cutter reel.

Another object is to provide an improved trimmer of the type described in which the cutter bar is supported entirely from one end yet is capable of rigid adjustment relative to the reel to provide proper clearance and parallelism.

Another object is to provide a grass trimmer having an improved arrangement for mounting and dismounting the reel to facilitate assembling and resharpening.

A further object of the invention is to provide an improved grass trimmer in which the drive wheel and reel shaft rotates about the same axis at different speeds.

A further object is to provide an improved grass trimmer in which the operating handle is rigid with the frame carrying the cutter bar with the frame pivoting around the common axis of the drive wheel and reel.

A still further object is to provide a single wheel grass trimmer in which the operating handle is designed to offset the unbalance of the assembly.

These and other objects and advantages residing in the combination, arrangement and construction of parts will become more apparent from a consideration of the following specifications and claims.

In the drawings,

Fig. I is an elevational view taken from the handle with position on the frame shown in broken cross sections, Fig. II is a side elevational view, Fig. III is an enlarged fragmentary perspective view of the counter balance adjustment, and Fig. IV is a cross sectional view taken on line IV—IV of Fig. III.

Referring to the drawings, my improved grass trimmer comprises a main frame member 10, shown as a casting, to which the handle 12 is rigidly attached by cap screws 14. The cross bar 16 carried at the upper end of the handle 12 is unbalanced with the longer portion 18 on the same side of the bar 12 as the ground wheel 20. By providing increased leverage in this manner the unbalanced weight of the reel 22 may be supported with ease.

The member 10 is offset toward the reel 22 to sufficiently space the bearing 24 and 26, in which the drive shaft 28 is mounted as to permit the omission of an outer bearing for the reel 22. As shown, the reel 22 has a hub 30 with a keyway 32. With the keyway 32 aligned with the key 34, the reel 22 is received upon the end 38 of the drive shaft 28 and held in position by the nut 40.

The ground wheel 20 is mounted on the needle bearing 42 upon the end 44 of the drive shaft 28 which is shown reduced and threaded at 46 to receive a nut 48 holding the bearing retainer 50 in position. In the illustrated construction, the wheel 20 comprises an integral cast hub and internal gear member 52 having gear teeth 54 with which the idler gears 56 and 58 mesh and are driven to drive the pinion gear 60 keyed to the shaft 28 at 62.

It will be noted that the shaft 28 turns at reel speed with the result that the shaft 28 turns within the wheel bearings at a faster speed than the ground wheel 20 is rotating about its axis.

The reel 22 has conventional spider stampings 64 supporting twisted blades 66 which co-act with the leading edge 68 of the cutter bar 70 to shear the blades of grass. Support and adjustment of the cutter bar 70 is provided through an integral flange 72 having threaded apertures at 74, 76, 78 and 80. A cap screw 82 closely fitted in a hole 84 in the frame 10 engages with the threaded aperture 74 to provide a pivot point for the flange 72 and cutter bar 70. Threaded in the aperture 80 is a clamp screw 86 which projects through an elongated slot 88. By tightening the screw 86, the flange 72 may be clamped to the frame 10 in different portions of an angular adjustment about the axis of the screw 82. To bring the edge 68 into parallelism with the blade 66 of the reel 22, the set screws 90 and 92 are adjusted in the threaded apertures 76 and 78. It will be understood that the set screws 90 and 92 bear against the face 94 of the recess 96 of the frame 10 in which the flange 72 is supported.

The conventional ground roller for determining the height of cut has been eliminated from my improved grass trimmer. As will be readily appreciated, the ground wheel 20 with the reel 22 parallel to the ground will generally determine the height of cut with a minor adjustment being possible through raising and lowering the cross bar 16 and the handle 12. It is to be understood, however, that raising and lowering the cross bar 16 in a normal operating range does not appreciably affect the height of cut for the reason that the frame 10 to which the cutter bar 70 is fixed pivots about the drive shaft 28, as does the handle 12.

Another distinguishing feature of the present invention resides in the method of support of the reel 22 entirely from one side, which, with the elimination of the ground roller, permits the trimming of grass directly adjacent walls, fences, shrubbery, and along curbs and sidewalks and other places to which the conventional lawn mower is not suited.

Having thus described my invention, what I claim as new and desire to be covered by Letters Patent is:

1. In a grass trimmer, a frame, a reel supported from said frame, a cantilever cutter bar supported from said frame in parallelism with said reel, said bar having an end member adjacent said frame, a pivotal connection between said member and said frame, about which said bar may be swiveled relative to said reel, and means disposed between said member and frame and spaced from said pivotal connection to swing the outer end of said member toward and from the reel about a pivotal point adjacent said frame.

2. A grass trimmer comprising a bearing housing having a radial side plate for the ground wheel, a shaft extending through said housing, spaced bearings for said shaft carried in said housing, an operating handle attached to one side of said plate, a ground wheel disposed directly adjacent the other side of said plate and supported on said shaft, a cutting reel on said shaft on the opposite side of said plate from said wheel and into which a substantial portion of said housing telescopes, one of said bearings being adjacent said wheel and another bearing being located within that portion of said housing telescoping with said reel.

3. A manually propelled grass trimmer characterized by a single ground wheel and an open-ended reel to enable the cutting of grass directly adjacent a wall or other vertical obstruction comprising a main frame in the form of a relatively thin radial flange having a hub projecting from the reel side thereof, an operating handle rigidly attached to said flange and disposed in the same general vertical plane thereof, a bearing in said frame disposed in the plane of said flange, a second bearing spaced from and aligned with said first bearing and carried in the projected end of said hub, a driven shaft having its central portion supported in said bearings with the end portions of said shaft extending in opposite directions from said bearings, a ground wheel supported for relative rotation upon said shaft upon the end thereof projecting beyond said first bearing with the ground engaging portion of said wheel directly adjacent the general vertical plane of said flange and handle, a driving connection between said wheel and said shaft directly adjacent said first bearing, an open-ended cutting reel having spider supported circumferentially spaced spiral blades, said reel being attached to and driven by the end of said shaft extending beyond said second bearing, said hub being projected into said reel with substantial portions of said blades extending both inwardly towards said flange and outwardly therefrom with respect to said second bearing, and a cutter bar mounted on said flange for adjustment relative to the blades of said reel.

TRUMAN B. FUNK.

REFERENCES CITED

The following references are of record in the file of this patent:

UNITED STATES PATENTS

| Number | Name | Date |
| --- | --- | --- |
| 633,643 | Feerer | Sept. 26, 1899 |
| 730,133 | Lake | June 2, 1903 |
| 783,052 | Lake | Feb. 21, 1905 |
| 891,867 | Secrest | June 30, 1908 |
| 897,436 | Watkins | Sept. 1, 1908 |
| 987,552 | Champion | Mar. 21, 1911 |
| 1,489,868 | Wahl | Apr. 8, 1924 |

FOREIGN PATENTS

| Number | Country | Date |
| --- | --- | --- |
| 18,118 | Great Britain | Oct. 22, 1903 |